United States Patent
Iannelli

(10) Patent No.: US 7,412,174 B2
(45) Date of Patent: Aug. 12, 2008

(54) METHOD AND APPARATUS FOR DISTORTION CONTROL FOR OPTICAL TRANSMITTERS

(75) Inventor: John Michael Iannelli, San Marino, CA (US)

(73) Assignee: Emcore Corporation, Albuquerque, NM (US)

( * ) Notice: Subject to any disclaimer, the term of this patent is extended or adjusted under 35 U.S.C. 154(b) by 706 days.

(21) Appl. No.: 10/946,056

(22) Filed: Sep. 21, 2004

(65) Prior Publication Data

US 2006/0018583 A1 Jan. 26, 2006

Related U.S. Application Data

(60) Provisional application No. 60/567,829, filed on May 5, 2004.

(51) Int. Cl.
*H04B 10/04* (2006.01)
*H04B 10/00* (2006.01)

(52) U.S. Cl. .................. 398/194; 398/192; 398/195; 398/159

(58) Field of Classification Search .............. 398/192, 398/193, 194, 195, 196, 197, 198, 159, 158, 398/25, 9; 372/33, 34, 35, 36; 356/51, 73.1, 356/450, 477
See application file for complete search history.

(56) References Cited

U.S. PATENT DOCUMENTS

| | | | |
|---|---|---|---|
| 3,794,841 A | 2/1974 | Cosentino et al. |
| 4,156,206 A | 5/1979 | Comerford et al. |
| 4,466,694 A | 8/1984 | MacDonald |
| 4,704,720 A | 11/1987 | Yamaguchi |
| 4,786,132 A | 11/1988 | Gordon |
| 4,992,754 A | 2/1991 | Blauvelt et al. |
| 5,003,546 A | 3/1991 | Lidgard et al. |
| 5,132,639 A | 7/1992 | Blauvelt et al. |
| 5,161,044 A | 11/1992 | Nazarathy et al. |
| 5,172,068 A | 12/1992 | Childs |
| 5,227,736 A | 7/1993 | Tucker et al. |
| 5,252,930 A | 10/1993 | Blauvelt |
| 5,257,124 A | 10/1993 | Glaab et al. |
| 5,424,680 A | 6/1995 | Nazarathy et al. |
| 5,430,569 A | 7/1995 | Blauvelt et al. |

(Continued)

FOREIGN PATENT DOCUMENTS

JP   2002-317451   * 10/2002

OTHER PUBLICATIONS

Monday Morning/Cleo'97; p. 27; CMG; WDM Sources—Thomas L. Koch, Lucent Technologies Bell Labs, Presider.

(Continued)

*Primary Examiner*—M. R. Sedighian

(57) ABSTRACT

A method of manufacturing an optical transmitter includes assembling a laser device on a module including a temperature sensor and a temperature controller. An optimum operating temperature of the laser to minimize optical distortion is determined at a temperature within a range between which distortions were determined at multiple temperatures. The temperature controller is selectively adjusted so as to operate the laser at the optimum temperature. The distortion may also be monitored during active laser operation. The temperature controller may be selectively adjusted, based on the monitoring of the distortion, so as to operate the laser at a new controlled temperature nearer that which produces the temperature-dependent distortion minimum.

30 Claims, 4 Drawing Sheets

U.S. PATENT DOCUMENTS

| | | | |
|---|---|---|---|
| 5,436,749 | A | 7/1995 | Pidgeon, Jr. et al. |
| 5,453,868 | A | 9/1995 | Blauvelt et al. |
| 5,485,481 | A | 1/1996 | Ventrudo et al. |
| 5,546,281 | A | 8/1996 | Poplawski et al. |
| 5,717,533 | A | 2/1998 | Poplawski et al. |
| 5,717,804 | A | 2/1998 | Pan et al. |
| 5,798,854 | A | 8/1998 | Blauvelt et al. |
| 5,812,716 | A | 9/1998 | Ohishi |
| 5,845,030 | A | 12/1998 | Sasaki et al. |
| 5,870,417 | A | 2/1999 | Verdiell et al. |
| RE36,820 | E | 8/2000 | McGinley et al. |
| 6,122,085 | A | 9/2000 | Bitler |
| 6,179,627 | B1 | 1/2001 | Daly et al. |
| 6,207,950 | B1 | 3/2001 | Verdiell |
| 6,220,873 | B1 | 4/2001 | Samela et al. |
| 6,246,965 | B1 | 6/2001 | Cockerham et al. |
| 6,252,693 | B1 | 6/2001 | Blauvelt |
| 6,288,814 | B1 | 9/2001 | Blauvelt |
| 6,356,679 | B1 | 3/2002 | Kapany |
| 6,373,644 | B1 | 4/2002 | Flanders |
| 6,416,937 | B1 | 7/2002 | Flanders et al. |
| 6,446,867 | B1 | 9/2002 | Sanchez |
| 6,517,382 | B2 | 2/2003 | Flickinger et al. |
| 6,535,315 | B1 | 3/2003 | Way et al. |
| 6,538,789 | B2 | 3/2003 | Sun |
| 6,661,814 | B1 | 12/2003 | Chapman et al. |
| 6,661,815 | B1 | 12/2003 | Kozlovsky et al. |
| 6,864,414 | B2 | 3/2005 | Sharps et al. |
| 7,071,407 | B2 | 7/2006 | Faterni et al. |
| 7,115,811 | B2 | 10/2006 | Ho et al. |
| 7,170,914 | B2 * | 1/2007 | Narayan ............... 372/34 |
| 2002/0171894 | A1 * | 11/2002 | Sun ............... 359/161 |
| 2005/0271396 | A1 * | 12/2005 | Iannelli ............... 398/193 |

OTHER PUBLICATIONS

"A Model of Si Diffusion in GaAs Based on the Effect of the Fermi Level", Shaofeng Yu, Ulrich M. Gosele, The Y. Tan, Journal of Appl. Phys. 66 (7), Oct. 1, 1989, pp. 2952-2961, 1989 American Institute of Physics.

"Role of Point Defects in the Silicon Diffusion in GaAs and Al(0.3)Ga(0.7)As and in the Related Superlattice Disordering", L. Pavesi, Nguyen Hong Ky, J.D. Geniere, F.K. Reinhart, N. Baba-Ali, I. Harrison, B. Tuck, M. Henini, Journal of Appl. Phys. 71 (5), Mar. 1, 1992 pp. 2225-2237, 1992 American Institute of Physics.

R.G. Harrison and D. Yu, "Stimulated Brillouin Scattering", Chapter 0.1, R. Pike and P. Sabatier, eds., Scattering: Scattering and Inverse Scattering in Pure and Applied Science, © 2001, Academic Press, pp. 1-11.

R. Wyatt, W.J. Devlin, "10 kHz Linewidth 1.5μm InGaAsP External Cavity Laser with 55nm Tuning Range", Electronic Letters, vol. 19, pp. 110-112, 1983.

D.M. Bird et al, "Narrow Line Semiconductor Laser Using Fibre Grating", Electronics Letters, vol. 27, Issue 13, pp. 1115-1116, Jun. 20, 1991.

M. Ziari et al., "High-Speed Fiber-Grating-Coupled Semiconductor Wavelength-Division Multiplexed Laser", CLEO '97, paper CMGI, May 20-22, 1997, Baltimore, MD, p. 27.

M.S. Whalen et al., "Tunable Fibre-Extended-Cavity Laser", Electronics Letters, vol. 23, No. 7, pp. 313-314, Mar. 1987.

C.A. Park et al., "Single-Mode Behavior of a Multimode 1.55 μm Laser With a Fire Grating External Cavity", Electronics Letters, vol. 22, No. 21, pp. 1132-1133, Oct. 9, 1986.

E.E. Bergmann et al., "Dispersion-Induced Composite Second-Order Distortion at 1.5 μm", IEEE Photonics Technology Letters, vol. 3, No. 1, pp. 59-61, Jan. 1991.

C.Y Kuo and E.E. Bergmann, "Erbium-Doped Fiber Amplifier Second-Order Distortion in Analog Links and Electronic Compensation", IEEE Photonics Technology Letters, vol. 3, No. 9, pp. 829-831, Sep. 1991.

C.Y. Kuo, "Fundamental Second-Order Nonlinear Distortions in Analog AM CATV Transport Systems Based on Single Frequency Semiconductor Lasers", Journal of Lightwave Technology, vol. 10, No. 2, pp. 235-243, Feb. 1992.

R. Nagarajan et al., "Millimeter Wave Narrowband Optical Fiber Links Using External Cavity Semiconductor Lasers", Journal of Lightwave Technology, vol. 12, No. 1, pp. 127-136, Jan. 1994.

L. A. Coldren and T. L. Koch, "External-Cavity Laser Design", Journal of Lightwave Technology, vol. LT-2, No. 6, pp. 1045-1051, Dec. 1984.

A. Lidgard and N.A. Olsson, "Generation and Cancellation of Second-Order Harmonic Distortion in Analog Optical Systems by Interferometric FM-AM Conversion", IEEE Photonics Technology Letters, vol. 2, No. 7, pp. 519-521, Jul. 1990.

T. E. Darcie et al., "Fiber-Reflection-Induced Impairments in Lightwave AM-VSB CATV Systems", Journal of Lightwave Technology, vol. 9, No. 8, pp. 991-995. Aug. 1991.

V. Sykes, "External-Cavity Diode Lasers for Ultra-Dense WDM Networks", Lightwave, Mar. 2001.

* cited by examiner

METHOD AND APPARATUS FOR DISTORTION CONTROL FOR OPTICAL TRANSMITTERS

PRIORITY

This application claims the benefit of priority to U.S. provisional patent application No. 60/567,829 filed May 5, 2004, which is hereby incorporated by reference.

REFERENCE TO RELATED APPLICATIONS

This application is related to co-pending U.S. patent application Ser. No. 11/097,746 filed Apr. 1, 2005.

BACKGROUND

1. Field of the Invention

The invention relates to optical transmitters, and particularly to manufacturing an optical transmitter to minimize a temperature-dependent distortion characteristic of an optical signal transmitted through an optical fiber.

2. Description of the Related Art

A modern alternative to sending analog or binary digital information via electric voltage signals over a conductor is to use optical (light) signals over a fiber optic cable. Electrical signals from analog radio frequency or digital circuits (high/low voltages) may be converted into amplitude or frequency modulated optical signals with LEDs or solid-state lasers such as VCSELs or edge-emitting lasers. Likewise, optical signals can be translated back into electrical form through the use of photodiodes or phototransistors for introduction into the inputs of amplifiers, demodulators or other types of circuits.

Laser resonators have two distinct types of modes: transverse and longitudinal. Transverse modes manifest themselves in the cross-sectional intensity profile of the beam. Longitudinal modes correspond to different resonances along the length of the laser cavity which occur at different wavelengths within the gain bandwidth of the laser. Mode hopping occurs when relative intensities at different lines corresponding to different longitudinal modes shift under certain circumstances. In order to provide a reliable communications link utilizing an optical transmitter, it is desired to prevent mode hopping in lasers used in such optical communications applications.

A factor in whether mode hopping will tend to occur in a laser is the degree of stability of the laser. There are many forms of stability, including wavelength stability, pulse-to-pulse energy stability, repetition rate stability, thermal stability, bandwidth stability, among others, and these may be attempted to be controlled in various ways. For example, energy stability and repetition rate stability often depend on the stability of the electrical or optical energy input to the gain medium. The degree of wavelength or bandwidth stability may depend on quality of resonator materials and other factors. The degree of thermal stability may influence the wavelength or bandwidth stability, and may typically depend on the heat capacity of the gain medium and whether cooling and/or heating elements are provided along with a thermal sensor, i.e., a temperature controller, heat exchanger or other such thermal monitor and heat transport device, and what degree of sensitivity of thermal control these devices exhibit. Various developments have been made for stabilizing various parameters of laser systems including operating temperature, and preventing occurrences of mode hopping.

Transmitting digital information in optical form from the optical end may be done in open air, simply by aiming a laser or an array of lasers of a transmitter or transceiver at a photodetector at a remote distance, but interference with the beam, beam divergence, scattering, dispersion, etc., make it difficult to transmit the beam without very significant distortion. One way to avoid the problems of open-air optical data transmission is to send the light pulses down an optical fiber. Optical fibers will transmit a beam of light much as a copper wire will conduct electrons, with the advantage of completely avoiding all the associated problems of inductance, capacitance, and external interference plaguing electrical signals.

Even for single modes of an optical medium, a light pulse emitted by a LED, VCSEL, edge-emitting laser, etc., taking a shorter path through the medium will arrive at the detector sooner than light pulses taking longer paths. The materials that form optical media will impart some degree of chromatic dispersion, or variation of the group velocities of different frequencies of the detected signal. The result is distortion of the amplitude and phase of an information-carrying signal. This problem becomes worse for broader bandwidths or modulation frequencies and as the overall media length is increased. For very long distances, such as in optical communications equipment, even light pulses having very narrow bandwidths will result in signals exhibiting undesirable degrees of distortion.

Optical signals transmitted from a modulated laser transmitter over an optical medium are known to exhibit some degree of distortion, even with single mode lasers very narrow bandwidth and even when steps are carefully taken to stabilize the optical pulses by conventional methods, as briefly discussed above. Electronic pre-distortion circuitry has been developed in an effort to reduce distortion in optical signals, e.g., see U.S. Pat. Nos. 6,288,814, 5,798,854, 5,252,930, 5,132,639, and 4,992,754, which are hereby incorporated by reference. Distortion appears at the output of an external cavity laser (ECL), and is an effect of the laser design. Although there is also distortion presented when the laser is linked to an optical fiber, it is not as great and does not vary as much as the ECL distortion.

Due to significant thermal influences on distortion, pre-distortion circuitries may be preferably configured to operate in dependence upon the operating temperature of a non-linear laser. Multiple pre-distorter settings may be provided such that particular settings, e.g., voltages for controlling pre-distorter outputs, may be selected depending on monitored temperatures of the laser. Moreover, laser output may be monitored through a fiber tap to detect any variation in amplitude or phase, and in response thereto, the laser temperature may itself be controlled and somewhat stabilized, e.g., using temperature sensors and thermal electric coolers (TECs), such that influences of thermal variation on distortion by adjusting the pre-distortion circuitry. Due to its substantial influence on the quality of optical communications signals, it is desired to further control and reduce distortion, particularly in optical signals generated by external cavity lasers (which include a laser chip together with an external reflector).

It is known from the work of other researchers that the degree of distortion of a transmitted optical signal in an external cavity laser is dependent on the temperature of the laser transmitter. Moreover, it is also known from such work that the distortion typically has a discernible minimum at a certain temperature for a single operating mode of the laser transmitter that varies from laser to laser. It is therefore a goal of the present invention to provide a method for manufacturing, and a configuration for a laser transmitter system for optical communications that is thermally-stabilized around that distortion minimum of the utilized laser.

SUMMARY OF THE INVENTION

Although undesirable optical signal distortion exists in laser transmitter systems for communications, it may be reduced or minimized under certain circumstances, and particularly by controlling the laser transmitter temperature. The present invention takes into account that laser sources of optical transmitters produce modulated optical signals having an optical signal distortion characteristic that is dependent on laser operating temperature when the signals are transmitted through a dispersive medium, such as air, water, glass, plastic, etc. It is further recognized that a minimum exists in the distortion vs. laser operating temperature curves of these optical signal transmitter systems within a single operational longitudinal mode of the laser. It is desired, then, to operate the laser at or near the temperature at which the distortion minimum exists.

It is recognized that although the distortion curves of these laser transmitter systems uniformly have temperature-dependent distortion minima within operational modes, the minima for each laser transmitter system are not all present at the same temperature. That is, the temperature at which the distortion minimum exists for each laser transmitter varies for each laser system. If the temperature of the distortion minimum for each laser transmitter system is determined, then the system may be operationally maintained at approximately that temperature and thus at that distortion minimum. Thermally-induced mode hopping is less likely to occur when the temperature is maintained at approximately that which produces a distortion minimum, and minimized distortion is also recognized as generally beneficial in a laser transmitter system.

A method of manufacturing an optical transmitter system is therefore provided. The optical transmitter system includes a laser or laser array for producing a modulated optical signal coupled to and transmitted through a dispersive optical medium. The laser has a temperature-dependent optical signal distortion characteristic at its output. The distortion characteristic has a minimum in the operating temperature range between a first predetermined temperature and a second higher predetermined temperature. The first and second temperatures are defined by the laser generating optical radiation at a different mode when operated at temperatures below the first temperature and above the second temperature.

The manufacturing method includes assembling a laser device on a module including a temperature sensor and a temperature controller. The optimum operating temperature of the laser s determined for minimizing the distortion at a temperature between the first and second temperatures. The temperature controller is selectively adjusted so as to operate the laser at approximately the optimum temperature.

The optimum temperature may be determined by initially setting the temperature at the first temperature or the second temperature or another temperature away from the temperature minimum, and measuring the distortion. The temperature is then incremented toward the other of he first and second temperatures in the direction of the temperature minimum and the distortion s measured again. The incrementing and measuring is repeated until the temperature range between the first and second temperatures is fully scanned or at least until the minimum is scanned through and determined. The temperature may be preferably stepped and alternatively scanned through the temperature range or at least through the temperature at which the distortion minimum exists.

It is further recognized that an on-line method may be advantageously utilized alone or in combination with the manufacturing method of the invention. The method may involve measuring the distortion of a split-off portion of an active laser transmission or some full or partial portion of a temporarily off-line transmission. To the extent that it is determined that the distortion minimum may have shifted to a new temperature, then the temperature controller is adjusted to control the temperature of the laser at or near the new temperature. A feedback loop may be arranged, wherein the distortion is constantly or periodically measured, and the temperature of the laser adjusted as based on the distortion measurement. The feedback loop may be configured by splitting off a beam portion of the active transmission of the laser, or by inserting a distortion detector in the laser transmission light path for a predetermined time, and then removing it from the light path.

An optical signal transmission system is also provided. An optical module includes a light source that generates optical pulses that are propagated as a modulated optical signal from the module through a light guide. The light source has a temperature dependent optical signal distortion characteristic when the optical signal is transmitted through the light guide, and such characteristic has a minimum at an optimum temperature within an operating temperature range. A distortion analyzer detector analyzes a distortion of the optical signal, including measuring a distortion, or another parameter indicative thereof, of at least a portion of the optical signal, and generating a diagnostic signal based thereon. A control module determines a temperature at which the module is to be adjusted to following the analyzing. A temperature controller receives a control signal from the control module to maintain the module at or near the determined temperature. Pursuant to multiple distortion measurements, an original optimum temperature is approximately determined and set as an operating temperature to be maintained by the temperature controller.

In another embodiment, an optical signal transmission system again includes a light source that generates optical pulses that are propagated as a modulated optical signal from the module through a light guide. The light source has a temperature dependent optical signal distortion characteristic when the optical signal is transmitted through the light guide, and such characteristic has a minimum at an optimum temperature within an operating temperature range. including a light source and light guide for transmitting optical signals. The distortion analyzer detector of this embodiment analyzes a distortion of the optical signal on-line during active operation of the optical signal transmission module, including measuring a distortion, or another parameter indicative thereof, of a portion of the optical signal, and generating a diagnostic signal based thereon. The control module determines a temperature at which the module is to be maintained at or adjusted to pursuant the analyzing. The temperature controller receives a control signal from the control module to maintain the module at or near the determined temperature. Pursuant to the distortion measurements, one or more optimum temperatures are approximately determined and set as operating temperatures to be maintained by the temperature controller at times during said active operation of the module.

DETAILED DESCRIPTION OF THE PREFERRED EMBODIMENT

Figure 1:
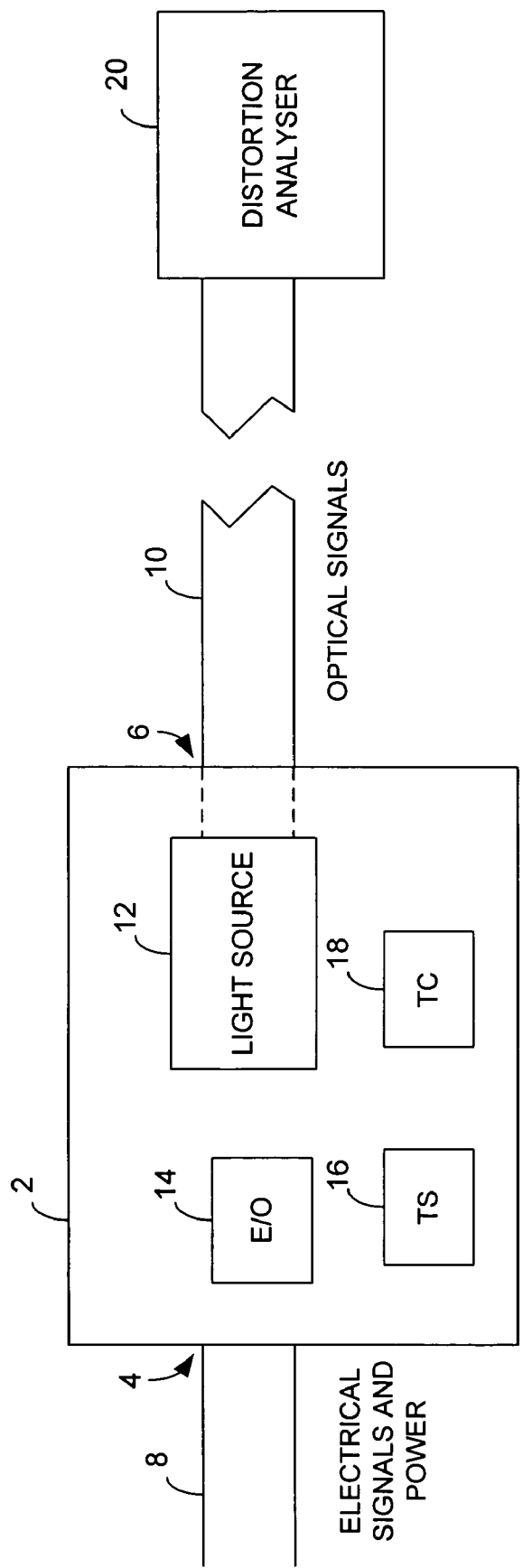
FIG. 1 schematically illustrates in block format an arrangement for determining the temperature at which the distortion minimum exists for a particular laser transmitter system.

An exemplary arrangement for determining a temperature at which a distortion minimum exists for an optical transmitter is illustrated in block form in FIG. 1. The module 2 is shown having an electrical end 4 and an optical end 6. An electrical cable 8 is coupled to the module 2 at the electrical end 4, while a fiber optic cable 10 is coupled to the module 2 at the optical end 6. The module includes the light source 12 that emits optical signals based on electrical input signals. The emitted optical signals are guided to an optical medium such as a fiber optic cable within the housing either by disposing the light source very near the optical end 6 and/or by providing a light guide between the light source 12 and the optical end 6 of the module 2. An electro-optic converter module 14 is also schematically shown in FIG. 2.

The optical transmitter module 2 of FIG. 1 is also illustrated as including a temperature sensor (TS) 16 and a temperature controller (TC) 18. The temperature sensor 16 may be part of the temperature controller 18 or a separate component. The temperature controller 18 includes a heating and/or a cooling element such as a thermoelectric cooler (TEC), a flow of water, or another heat flow mechanism as understood by those skilled in the art. A distortion analyzer 20 is also illustrated in FIG. 1 coupled to another location of the optical medium 10. The distortion analyzer 20 receives the optical signals that are transmitted from the light source 12 of the module 2 into and through the optical medium 10. The distortion analyzer 20 may include a power meter, spectrum analyzer, or other measurement device that measures a quantity or parameter of the light signals based on which a distortion characteristic can be determined, either point by point or by analyzing a plot of multiple data points or a transform thereof. The temperature controller is selectively set to different temperatures within a range of temperatures around the distortion minimum. When the module is operating at or being scanned through each of multiple temperatures, the distortion analyzer is measuring the light signals it receives such that the distortion at each temperature is determined. From the multiple distortion versus temperature data points, a temperature at which a minimum distortion occurs can be determined.

Figure 2:
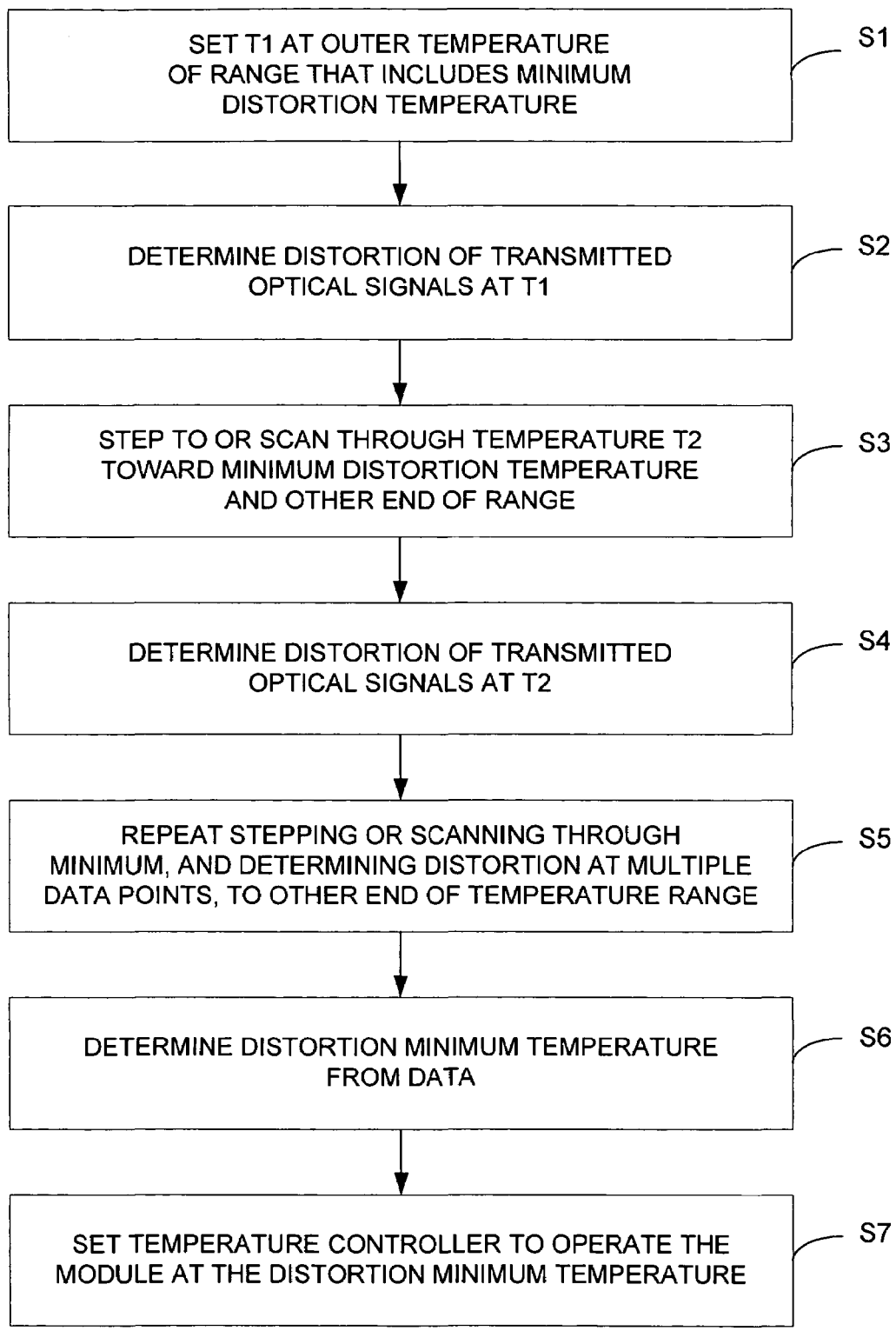
FIG. 2 is a flow diagram for performing a technique for determining the distortion minimum temperature of the laser transmitter system of FIG. 1.

FIG. 2 is a flow diagram illustrating steps or operations for performing a technique for determining the temperature at which the minimum distortion occurs for the laser transmitter system of FIG. 1. At S1, the temperature controller 18 of the assembled system of FIG. 1 is set to a first temperature T1 at the boundary of a range of temperatures that include the temperature at which the minimum distortion occurs. This range of temperatures preferably corresponds to the generation of optical radiation within a single mode. The signal is received at the distortion analyzer, a measurement is taken, and the distortion is determined at S2 for the optical signals transmitted by the system of FIG. 1 when the module is operating at the first temperature T1.

At S3, the temperature is then stepped to or scanned through a second temperature T2 a direction toward the distortion minimum temperature. At S4, the distortion is determined at this second temperature T2. The step or operation indicated as S5 in FIG. 2 illustrates that the stepping or scanning and determining of the distortion at third, fourth, etc. temperatures is repeated until the temperature range is incremented through and distortion data points are taken for temperatures in the range that includes temperature at which a minimum in distortion occurs.

At S6, the multiple data points are analyzed, so that a temperature at which a minimum of distortion occurs is determined. As this is a manufacturing method, the temperature controller is set to maintain the temperature of the module 2 at approximately the determined temperature. In this way, the temperature of the module will be controlled to vary around a central temperature that is that which has been determined to produce a minimum in the distortion versus temperature curve for this particular laser or LED transmitter module 2.

Figure 3:
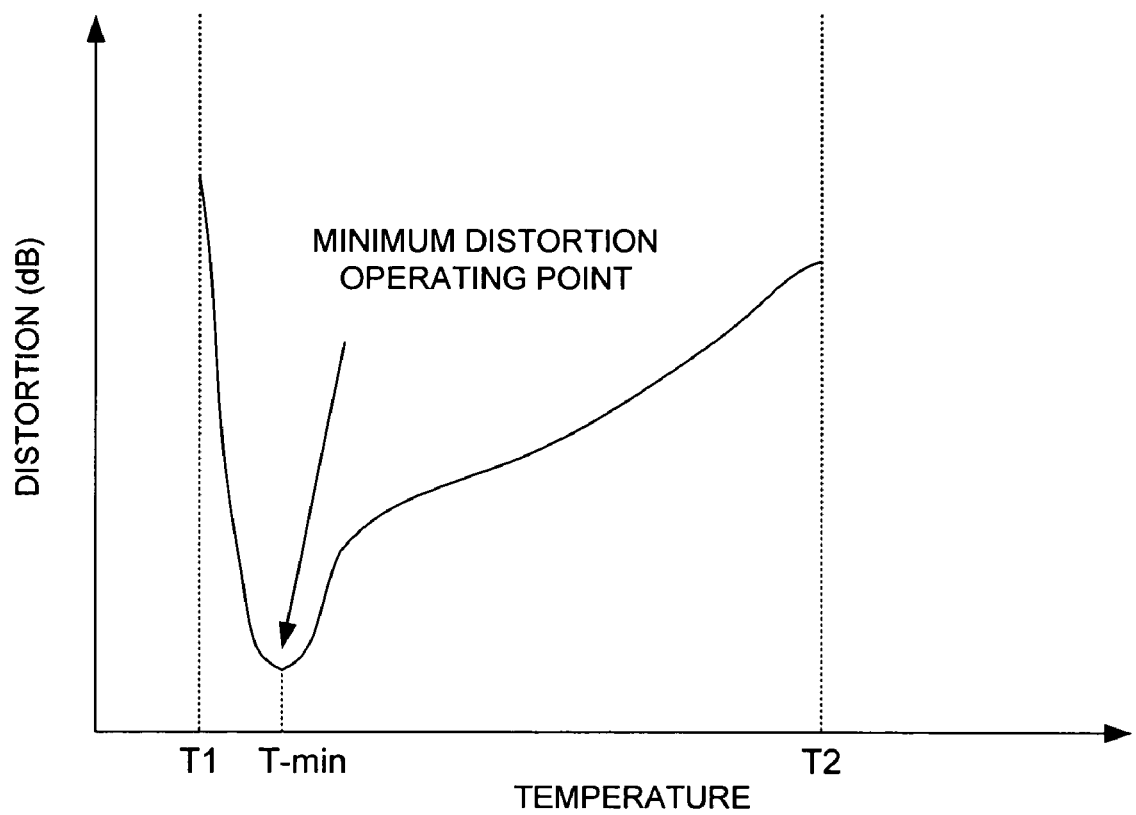
FIG. 3 illustrates a typical distortion versus temperature curve for a laser transmitter system that may be determined in accordance with a preferred embodiment, e.g., using the technique of FIG. 2.

FIG. 3 illustrates a distortion versus temperature plot for a particular transmitter module. It is understood that transmitter modules typically exhibit curves similar to that shown in FIG. 3. As indicated, however, the minimum or minima of transmitter modules will vary. Two temperatures T1 and T2 are shown at the boundaries of the temperature range. Distortions are determined at temperatures between T1 and T2 in the preferred method. The plot shown can be determined from the data by connecting data points with smooth connecting lines based on adjacent data points. As long as sufficient data points have been taken, the minimum distortion will be discernible from the data, and the temperature at which it occurs capable of determination. Finally, the temperature controller (TC) 18 of the transmitter module 2 (see FIG. 1) may be set to the determined temperature $T_{min}$ at which the distortion minimum has been measured and/or otherwise determined to occur.

In another embodiment of the invention, the arrangement schematically illustrated at FIG. 1 may be used during an on-line distortion monitoring process. An active communications process may be taken off-line temporarily, either periodically or at selected times, e.g., when signal quality is deteriorated beyond a certain tolerance, so that the distortion analyzer 20 may be inserted into the light path of the laser transmission. The process of stepping or scanning through a temperature range that includes the distortion minimum may be repeated as above or similarly. To the extent that the optimum temperature at which the distortion minimum exists has changed, the temperature controller may be selectively adjusted to that new temperature. The distortion analyzer is removed following the monitoring, and the communications process is brought back on-line and continued.

Although not shown in FIG. 1, the arrangement may be configured so that the distortion analyzer communicates either with the temperature controller directly or with a controller module. Results of the distortion monitoring are preferably processed at this controller module. The optimum temperature is determined and a signal is sent to adjust the temperature controller to an original or new optimum temperature when the optimum temperature differs from a present setting.

Figure 4:
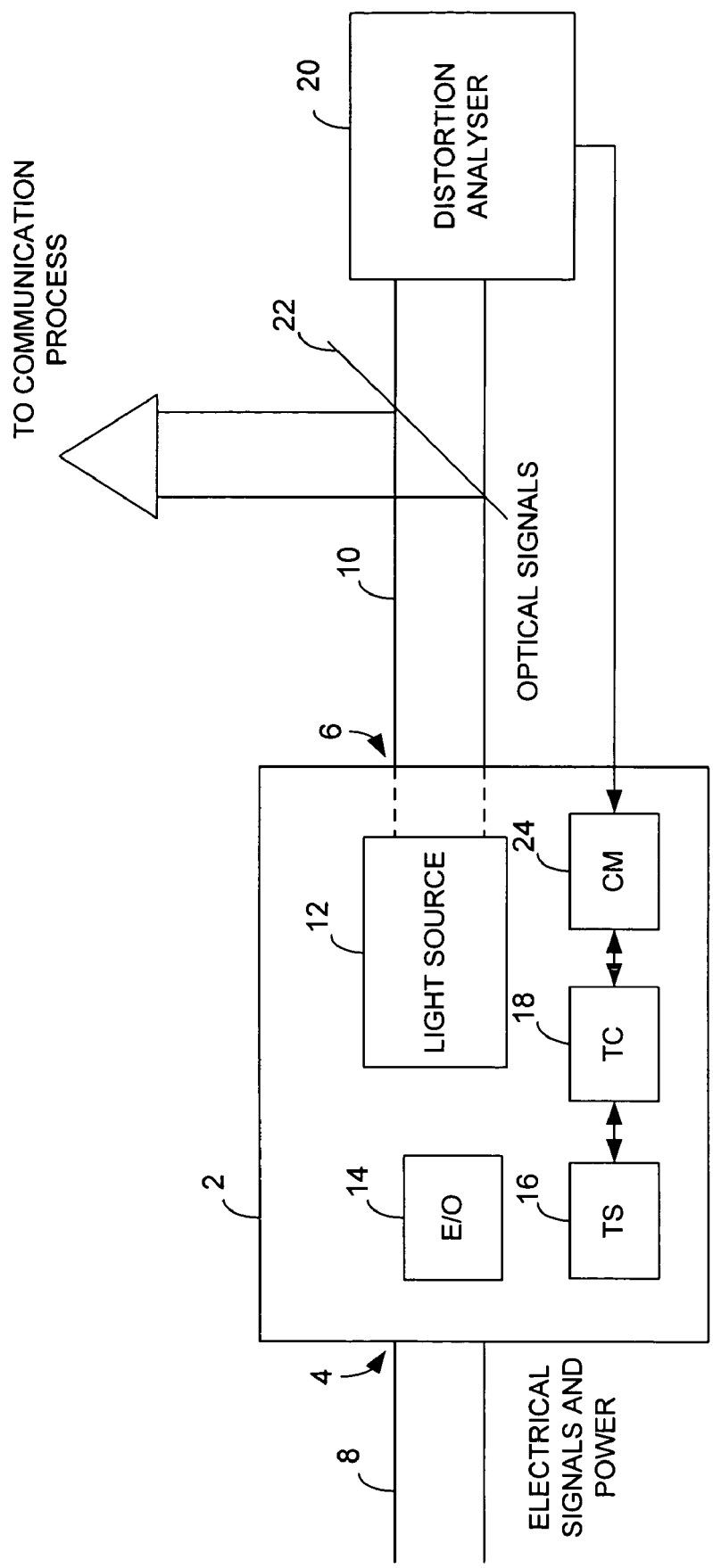
FIG. 4 schematically illustrates in block format a feedback arrangement for on-line monitoring of laser distortion for selectively adjusting the temperature at which a distortion minimum exists.

FIG. 4 schematically illustrates an alternative to the embodiment of FIG. 1, and the just-discussed feedback arrangement. FIG. 4 illustrates a feedback arrangement that may be used in performing an on-line method of monitoring distortion, and adjusting and controlling an optimum temperature at or near the distortion minimum. The arrangement of FIG. 4 includes the transmission module 2 including electrical input end 4 and optical output end 6 for respectively receiving electrical input transmissions 8 and transmitting optical signals 10. The module 2 preferably includes a laser, LED or other optical light source 12, electro-optic converted module 14, temperature sensor 16 and temperature controller 18. The input signals 8 may be wireless, optical or otherwise as understood by those skilled in the art, and the power 8 may be supplied in alternative ways. The laser 12 may be pumped optically, electrically or otherwise, as understood by those skilled in the art.

A beam splitter 22 is disposed in the light path of the laser transmission to split the signal into two components. One of those components with be directed or will continue to be directed to a receiver in a communications process. The other component will be transmitted to distortion analyzer 20. In this way, the communications process can continue to remain on-line and actively transmitted signals from the optical communications module 2, while the distortion of the laser transmission signals are being analyzed. A signal is preferably sent from the distortion analyzer to a control module (CM) 24. The control module 24 can be separate from or built into the optical communications module 2. The control module 24 preferably determines whether the temperature is at the optimum temperature based on the signal or signals received from the distortion analyzer 20. The control module 24 communicates a signal to the temperature controller 18 to adjust the temperature of the laser module 2 when it is determined that the operating and/or set temperature is different from the optimum temperature.

There are many alternative arrangements that are possible and that may be advantageous. For example, the distortion may be measured at one or more temperature points on either side of the set temperature periodically. As long as the distortion at these temperatures remains above that at the optimum temperature, then no adjustments are made. When a distortion amount is measured at one of these "outer" temperatures that is less than that measured at the optimum temperature, then further measurements may be then taken in a process for determining a new optimum temperature, or the new optimum temperature may be changed to that at which the lower distortion was measured, followed by continuing the same process of measuring distortion at points around the new optimum temperature. In another example, an extended range of temperatures may be scanned or stepped through during optical communications process pauses or down-times that may be scheduled or otherwise occur for other purposes, so that irregular optimum temperature determinations may be made at opportune times.

While an exemplary drawings and specific embodiments of the present invention have been described and illustrated, it is to be understood that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims and structural and functional equivalents thereof.

In addition, in methods that may be performed according to the invention and/or preferred embodiments thereof and that may have been described above or provided below, the operations have been described or otherwise provided in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

What is claimed is:

1. A method of manufacturing an optical transmitter including a laser for producing a modulated optical signal coupled to and transmitted through an optical fiber, wherein the laser has a temperature dependent optical signal distortion characteristic at its output, such characteristic having a minimum in the operating temperature range between a first predetermined temperature and a second higher predetermined temperature, such temperatures being defined by the laser generating optical radiation at a different mode when operated at temperatures below said first temperature and above said second temperature, comprising:
   assembling a laser device on a module including a temperature sensor and a temperature controller;
   scanning the temperature controller through the operating temperature range;
   directly measuring a quantity or a parameter of the modulated optical signal within a distortion analyzer at a plurality of temperatures within the operating temperature range;
   determining the distortion of the modulated optical signal from the measured quantity or parameter within the distortion analyzer at the respective plurality of temperatures across the scanned range of temperatures;
   determining the optimum operating temperature of the laser to minimize the distortion at a temperature between the first and the second temperatures; and
   selectively adjusting the temperature controller so as to operate the laser at said optimum temperature.

2. The method of claim 1, wherein the determining comprises setting the temperature to multiple selected temperatures between the first and second temperatures by adjusting the temperature controller; determining the distortion at each temperature; and determining the distortion minimum based on the distortion versus temperature data.

3. The method of claim 2, further comprising stepping the temperature incrementally through the multiple selected temperatures.

4. The method of claim 2, further comprising scanning the temperature gradually through the multiple selected temperatures.

5. The method of claim 1, wherein the assembling comprises coupling a first location of a fiber optic cable to a fiber end of the module for coupling light emitted by the laser into the fiber optic cable, and wherein the determining comprises disposing a light meter for analyzing the distortion of detected light at a second location of the fiber optic cable.

6. The method of claim 3, wherein the assembling comprises coupling an electrical cable to an electrical end of the module.

7. The method of claim 1, further comprising operating a distortion-temperature feedback loop during active transmission of the laser including repeatedly determining the distortion and adjusting the temperature of the laser to approximately minimize the distortion.

8. A method of operating an optical transmitter including a laser for producing a modulated optical signal coupled to and transmitted through an optical fiber, wherein the laser has a temperature dependent optical signal distortion characteristic having a minimum in the operating temperature range between a first predetermined temperature and a second higher predetermined temperature, such temperatures being defined by the laser generating optical radiation at a different mode when operated at temperatures below said first temperature and above said second temperature, comprising:

operating the laser at a controlled temperature between the first and second temperatures near that which produces a temperature-dependent distortion minimum;

scanning the temperature of the laser through the operating temperature range;

directly measuring a quantity or parameter of the modulated optical signal within a distortion analyzer at a plurality of temperatures within the operating range of temperatures;

determining the distortion of a laser transmission signal of the laser at the respective plurality of temperatures within the distortion analyzer; and selectively adjusting the temperature controller based on the measurement of the distortion so as to operate the laser at a new controlled temperature nearer that which produces said temperature-dependent distortion minimum.

9. The method of claim 8, wherein the method further comprises determining, prior to said operating of said laser, an optimum operating temperature of the laser to minimize the distortion at a temperature between the first and the second temperatures.

10. The method of claim 9, wherein the method further comprising determining, based on directly measuring of the distortion, a new optimum operating temperature of the laser to minimize the distortion at a temperature between the first and the second temperatures.

11. The method of claim 8, wherein the method further comprising determining, based on directly measuring of the distortion, a new optimum operating temperature of the laser to minimize the distortion at a temperature between the first and the second temperatures.

12. The method of claim 8, further comprising operating a distortion-temperature feedback loop during active transmission of the laser including repeatedly determining the distortion and adjusting the temperature of the laser to approximately minimize the distortion.

13. The method of claim 12, further comprising configuring said feedback loop by splitting off a beam portion of the active transmission of the laser.

14. The method of claim 12, further comprising configuring said feedback loop by inserting a distortion detector in the laser transmission light path for a predetermined time, and then removing it from the light path.

15. The method of claim 14, wherein the determining comprises setting the temperature to multiple selected temperatures between the first and second temperatures by adjusting the temperature controller; determining the distortion at each temperature; and determining the distortion minimum based on the distortion versus temperature data.

16. The method of claim 15, further comprising stepping the temperature incrementally through the multiple selected temperatures.

17. The method of claim 15, further comprising scanning the temperature gradually through the multiple selected temperatures.

18. The method of claim 8, further comprising assembling a laser device on a module including a temperature sensor and a temperature controller, and determining an original optimum operating temperature of the laser to minimize the distortion at a temperature between the first and the second temperatures.

19. The method of claim 18, wherein the assembling comprises coupling a first location of a fiber optic cable to a fiber end of the module for coupling light emitted by the laser into the fiber optic cable, and wherein the determining comprises disposing a light meter for analyzing the distortion at a second location of the fiber optic cable.

20. A system, comprising:

an optical signal transmission module including a light source;

a light guide coupled directly to a modulated optical signal generated by the light source, wherein the light source is configured to produce the modulated optical signal coupled to and transmitted through the light guide, and wherein the light source has a temperature dependent optical signal distortion characteristic having a minimum at an optimum temperature within an operating temperature range;

a distortion analyzer detector for analyzing a distortion of the optical signal, including measuring a distortion, or another parameter indicative thereof, of at least a portion of the optical signal, and generating a diagnostic signal based thereon;

a control module for determining a temperature at which the module is to be adjusted to following the analyzing; and a temperature controller within the signal transmission module for receiving a control signal from the control module to maintain the signal transmission module at or near the determined temperature, wherein the light source is scanned through a range of temperatures within the operating temperature range while the distortion analyzer obtains multiple distortion measurements from the modulated optical signal at respective temperatures within the range and wherein an original optimum temperature is approximately determined from the multiple distortion measurements and set as an operating temperature to be maintained by the temperature controller.

21. The system of claim 20, wherein the distortion analyzer detector is signal coupled to the control module and configured to analyze optical signal distortion on-line during operation of the optical signal transmission module, and wherein the control module determines, based on a signal from the distortion analyzer detector, whether to maintain the module temperature at the original optimum temperature or adjust it to a new temperature at or nearer to a present optimum temperature.

22. The system of claim 21, wherein the analyzing and determining is repeated from time to time, and the temperature of the module is maintained at or adjusted to determined temperatures.

23. The system of claim 20, wherein the module further comprises an electrical signal connector and an electro-optic signal converter module.

24. A system, comprising:

an optical signal transmission module including a light source;

a light guide directly coupled to a modulated optical signal from the light source generated by the light source, wherein the light source is configured to produce the modulated optical signal coupled to and transmitted through the light guide, and wherein the light source has a temperature dependent optical signal distortion characteristic having a minimum at an optimum temperature within an operating temperature range;

a distortion analyzer detector for analyzing a distortion of the optical signal on-line during active operation of the optical signal transmission module, including measuring a distortion, or another parameter indicative thereof, of a portion of the optical signal, and generating a diagnostic signal based thereon;

a control module for determining a temperature at which the module is to be maintained at or adjusted to pursuant the analyzing; and a temperature controller for receiving a control signal from the control module to maintain the signal transmission module at or near the determined temperature, wherein the light source is scanned through the operating temperature range by the temperature controller while the distortion analyzer obtains a plurality of distortion measurements at respective temperatures within the range and wherein from the distortion measurements, one or more optimum temperatures are approximately determined from the plurality of distortion measurements and set as operating temperatures to be maintained by the temperature controller at times during said active operation of the module.

25. The system of claim 24, wherein a temperature is automatically incremented or decremented, or both, during operation based on a programmed event, distortion is measured at each temperature, and a determination is made whether to maintain or adjust the module temperature.

26. The method as in claim 1 wherein the distortion analyzer further comprises a spectrum analyzer.

27. The method as in claim 8 wherein the distortion analyzer further comprises a spectrum analyzer.

28. The system as in claim 20 wherein the distortion analyzer further comprises a spectrum analyzer.

29. The system as in claim 24 wherein the distortion analyzer further comprises a spectrum analyzer.

30. An optical transmission module comprising:

a light source that generates a transmitted modulated optical signal;

a temperature sensor that detects a temperature of the light source; and a temperature controller that controls a temperature of the light source based a signal from the temperature sensor, wherein the light source has a temperature dependent optical signal distortion characteristic having a minimum at an optimum temperature within an operating temperature range and wherein an operating temperature of the temperature controller is established by setting a temperature T1 at an outer temperature of the operating temperature range that includes the minimum distortion temperature, determining a distortion of the transmitted optical signal at temperature T1, stepping to or scanning through a temperature T2 towards the minimum distortion temperature at the other end of the range, determining a distortion of the transmitted optical signals at temperature T2, repeating stepping or scanning through the minimum optical temperature and determining distortion at multiple data points to the other end of the operating temperature range, determining the distortion minimum temperature from the data points and setting the temperature controller to operate at module at the distortion minimum temperature.

* * * * *